United States Patent
LaPelusa

(10) Patent No.: US 7,043,876 B2
(45) Date of Patent: May 16, 2006

(54) ADJUSTABLE PLANT CAGE

(76) Inventor: Anthony J. LaPelusa, c/o LaPelusa Home Improvement, Inc., 6622 N. Milwaukee Ave., Niles, IL (US) 60714

( * ) Notice: Subject to any disclaimer, the term of this patent is extended or adjusted under 35 U.S.C. 154(b) by 0 days.

(21) Appl. No.: 10/931,833

(22) Filed: Sep. 1, 2004

(65) Prior Publication Data

US 2006/0042159 A1    Mar. 2, 2006

(51) Int. Cl.
*A01G 17/04*    (2006.01)
(52) U.S. Cl. .......................................... 47/47
(58) Field of Classification Search ............... None
See application file for complete search history.

(56) References Cited

U.S. PATENT DOCUMENTS

| | | | |
|---|---|---|---|
| 1,083,450 A | | 1/1914 | Lytle, Jr. |
| 1,536,679 A | * | 5/1925 | Markowski ............... 47/47 |
| 1,556,373 A | * | 10/1925 | Thoeni ..................... 47/47 |
| 2,764,846 A | | 10/1956 | Worthington |
| 3,302,328 A | * | 2/1967 | King ........................ 47/47 |
| 4,048,752 A | * | 9/1977 | Anderson ................. 47/47 |
| 4,677,788 A | | 7/1987 | Mastandrea |
| 4,860,489 A | | 8/1989 | Bork |
| 5,179,799 A | | 1/1993 | Hillestad |
| 5,341,593 A | * | 8/1994 | Foreman ................... 47/47 |
| 5,595,019 A | * | 1/1997 | Foreman ................... 47/47 |
| 5,640,802 A | * | 6/1997 | Elliott ...................... 47/45 |
| 6,453,606 B1 | * | 9/2002 | Shulman et al. .......... 47/47 |
| 6,912,809 B1 | * | 7/2005 | Malofsky et al. ......... 47/47 |

* cited by examiner

*Primary Examiner*—Francis T. Palo
(74) *Attorney, Agent, or Firm*—Wood, Philips, Katz, Clark & Mortimer

(57) ABSTRACT

An adjustable plant cage comprises an elongate rod having opposite first and second ends. The first end is for insertion into a ground surface with the rod extending upwardly. A plurality of wheels are provided. Each wheel comprises a hub slidably received on the elongate rod, a ring, and spokes connecting the ring to the hub. A plurality of annular flexible support elements are each positioned at a select longitudinal position in the elongate rod to support an associated one of the wheels.

13 Claims, 3 Drawing Sheets

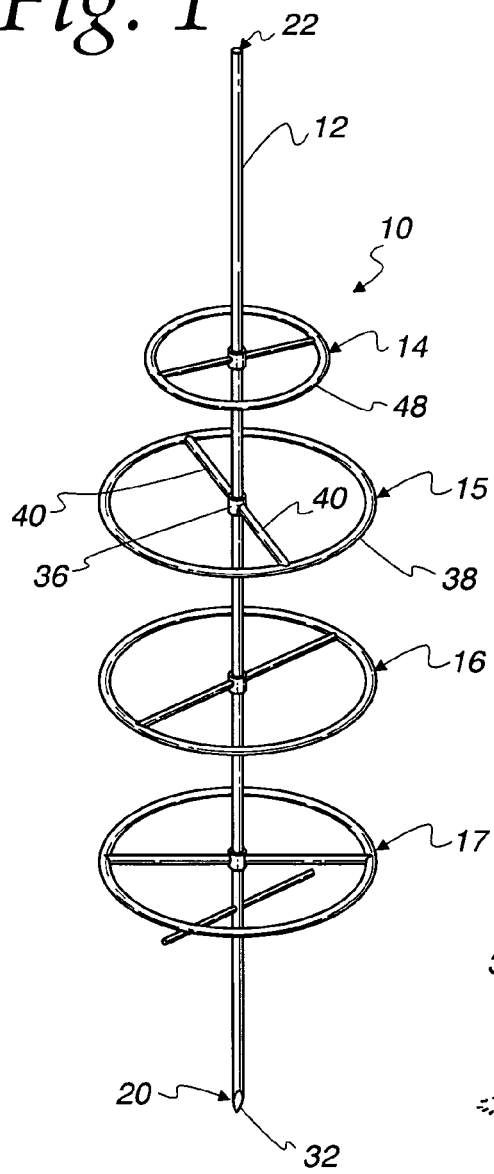
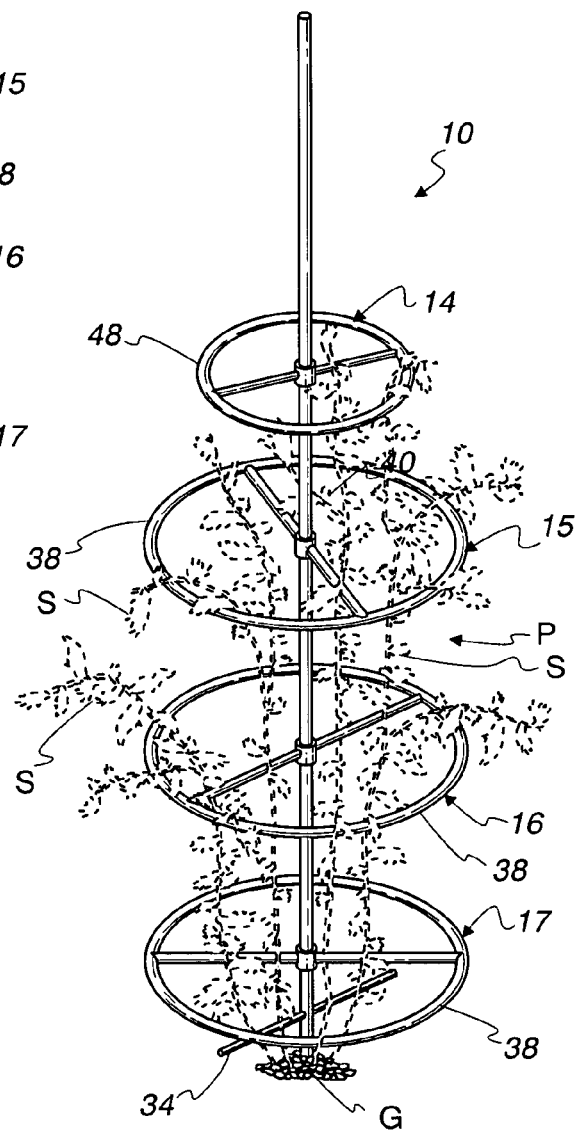

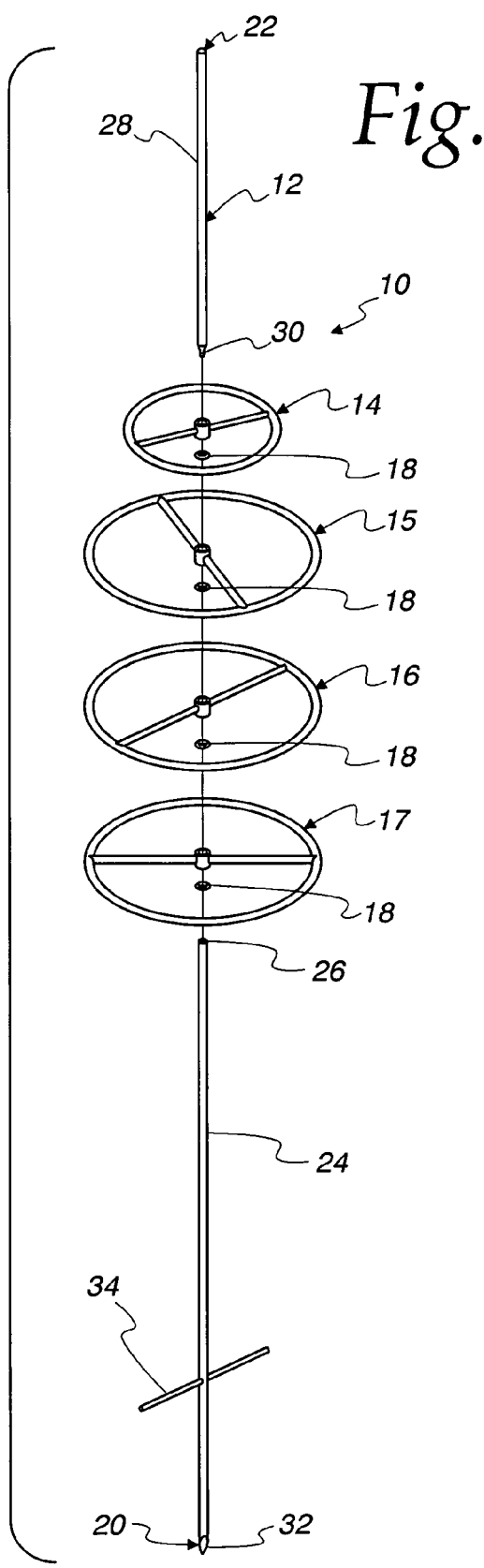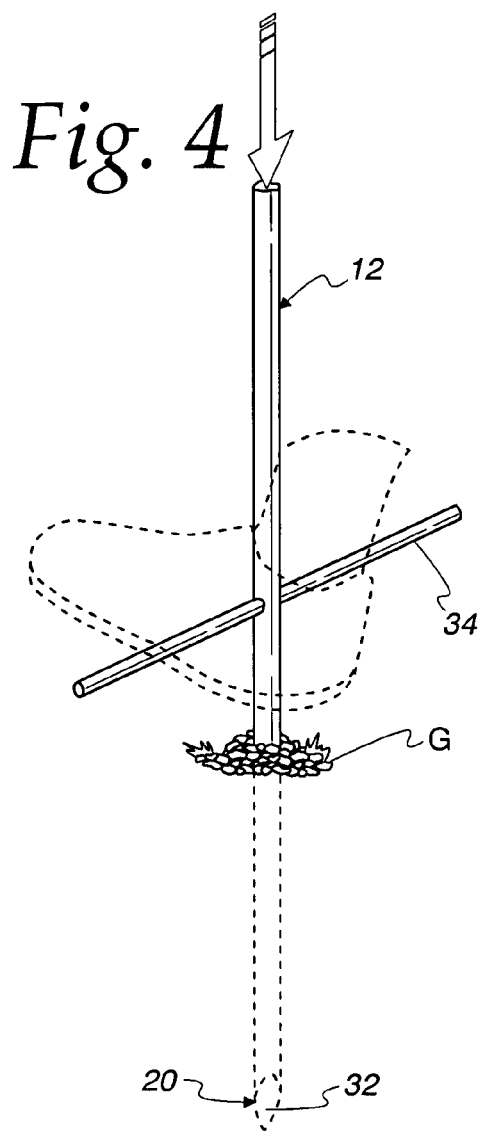

US 7,043,876 B2

ADJUSTABLE PLANT CAGE

FIELD OF THE INVENTION

The present invention relates to a plant cage and, more particularly, to a universally adjustable plant cage.

BACKGROUND OF THE INVENTION

Various support apparatus have been used to support plant material as it grows. Typical such support apparatus includes trellises and cages, such as a tomato cage. One common design of tomato cage includes a plurality of elongate rods and a plurality of rings, all made of metal. The rings are coaxial and vertically spaced from one another and secured to the rods. Often, the diameter of the rings decreases going from the highest ring to the lowest ring. Such a tomato cage is used by inserting the rods into the ground surrounding the roots of the tomato plant. As the plant grows, the stalks are generally maintained within the rings which support the stalks even under the heavy weight of the tomatoes. Such a cage design can be used for other types of plant material, as is well known.

Such a cage design satisfies the basic requirement of supporting the plant. However, any particular cage is fixed in size and cannot adapt to variations in plant size, the growth of the plant or the like. While different cage sizes can be made available, it is difficult to change the cage with a mature plant.

Various designs have been proposed for plant cages allowing for some aspect of adjustability. However, many of these designs are complex and expensive to produce. Likewise, packaging of various designs would be quite difficult. Moreover, adjustability in such designs is relatively limited and may not satisfy the needs from early stage of plant life to full maturity.

The present invention is directed to improvements in adjustable plant cages.

SUMMARY OF THE INVENTION

In accordance with the invention, there is provided an adjustable plant cage having universal adjustability.

In accordance with one aspect of the invention, there is disclosed an adjustable plant cage comprising an elongate rod having opposite first and second ends. The first end is for insertion into a ground surface with the rod extending upwardly. A plurality of wheels are provided. Each wheel comprises a hub slidably received on the elongate rod, a ring, and spokes connecting the ring to the hub. A plurality of annular flexible support elements are positioned at select longitudinal positions on the elongate rod to support an associated one of the wheels.

It is one feature of the invention that the flexible support elements comprise rubber bands.

It is another feature of the invention that the flexible support elements comprise O-rings.

It is still another feature of the invention that each hub comprises a tubular hub telescopically received on the rod and bearing on one of the flexible support elements.

It is another feature of the invention that the hub conceals the flexible support element.

It is still a further feature of the invention that each flexible support element restricts downward movement of its associated wheel while allowing free rotation and upward movement of its associated wheel.

It is still another feature of the invention to provide a stepping rod extending transversely of the elongate rod.

There is disclosed in accordance with another aspect of the invention an adjustable plant cage comprising an elongate rod having a lower end for insertion into a ground surface with the rod extending upwardly. A plurality of wheels each comprises a hub slidably received on the elongate rod, a ring, and spokes connecting the ring to the hub. A plurality of support means are each resiliently secured to the elongate rod at any longitudinal position for supporting an associated one of the wheels to restrict downward movement to the associated wheel while permitting rotary and upward movement of the associated wheel.

There is disclosed in accordance with a further aspect of the invention the method of supporting a plant comprising: providing an elongate rod having a lower end for insertion into a ground surface proximate a plant with the rod extending upwardly; providing a plurality of wheels, each wheel comprising a hub slidably receivable on the elongate rod, a ring, and spokes connecting to the hub; providing a plurality of annular flexible support elements; and alternately sliding the flexible support elements and the wheels on the rod, each flexible support element being positioned at any select longitudinal position on the elongate rod to support an associated one of the wheels so that the wheel supports stalks of the plant.

It is a feature of the invention that spacing between wheels can be any distance along the elongate rod.

Further features and advantages of the invention will be readily apparent from the specification and from the drawings.

BRIEF DESCRIPTION OF THE DRAWINGS

FIG. 1 is a perspective view of an adjustable plant cage in accordance with the invention;

FIG. 2 is a perspective view, similar to FIG. 1, illustrating the adjustable plant cage supporting a plant;

FIG. 3 is an exploded view of the adjustable plant cage of FIG. 1;

FIG. 4 is a partial, detailed view illustrating insertion of an elongate rod of the plant cage of FIG. 1 into a ground surface.

DETAILED DESCRIPTION OF THE INVENTION

Figure 5:
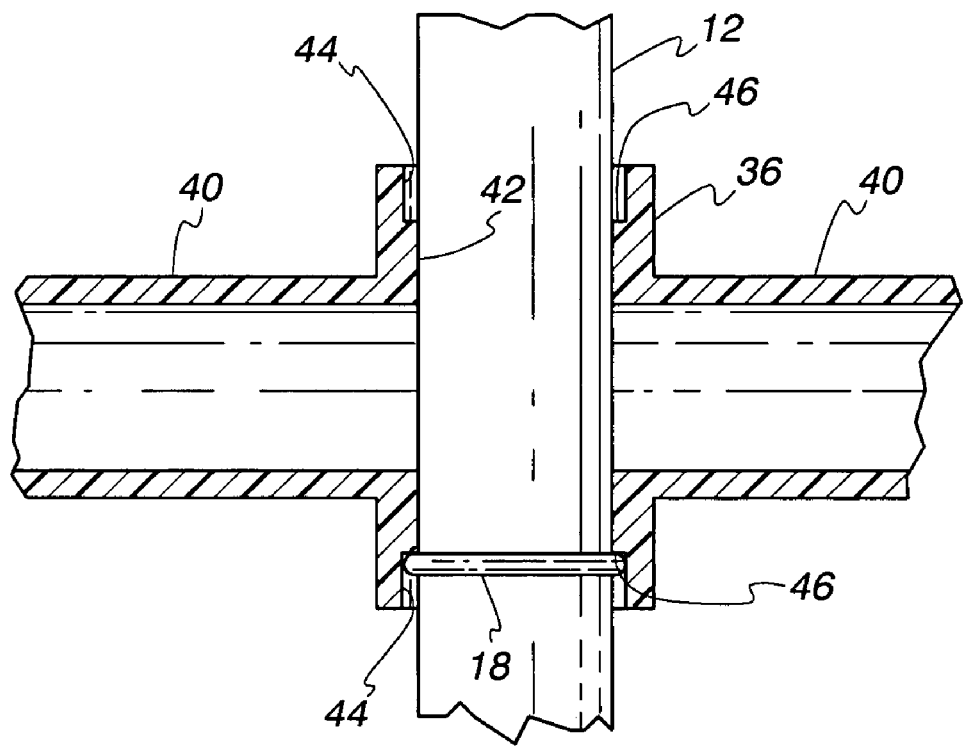
FIG. 5 is a partial sectional view illustrating a wheel supported on the elongate rod.

Referring to the drawings, there is illustrated an adjustable plant cage 10 in accordance with the invention providing for universal adjustability.

The adjustable plant cage 10 comprises an elongate pole or rod 12, a plurality of wheels 14, 15, 16 and 17 and a plurality of flexible support elements 18.

The elongate rod 12 has a first end 20 and an opposite second end 22. The elongate rod 12 may be of one piece construction or for shipping and storage may comprise multiple pieces as shown in FIG. 3. Particularly, the elongate rod 12 includes a lower rod 24 having an upper tubular end 26 and an upper rod 28 having a lower projection 30 receivable in the tubular end 26. The first end 20 is staked as at 32 to ease insertion into the ground. A stepping rod 34 extends transversely from each side of the elongate rod 12 a select distance from the first end 20. In an exemplary embodiment of the invention, the elongate rod 12 has an outer diameter of about ½" to 1". The length of the rod can be of any desired length according to the type of plant to be supported and may be on the order of 4' to 6' in length. Alternatively, a plurality of the upper rods 28 could be provided for extending the length of the elongate rod 12, as necessary or desired. The elongate rod 12 may be formed of metal for strength and durability or may be of a lightweight plastic.

The wheel 15 includes a hub 36, a ring 38 and a pair of spokes 40 connecting the ring 38 to the hub 36. Referring specifically to FIG. 5, the hub 36 is tubular having a through bore 42 with an inner diameter slightly larger than an outer diameter of the elongate rod 12 to be slidably received thereon. A counterbore 44 at each end of the hub 36 defines a shoulder 46 for support, as described below. Advantageously, the hub 36 has an axial length sufficient to prevent tilting of the wheel 38 on the rod 12. For example, the hub 36 may be about 2½" long. In the illustrated embodiment of the invention, the ring 38 is circular. However, the ring 38 could be other shapes, such as octagon, oblong, elliptical, or the like. The ring 38 is coaxial with the hub 36. The ring 38 can have any select diameter, again according to a plant size to be used with. Moreover, the rings 14–17 can all be of different sizes. Particularly, in the illustrated embodiment of the invention, the wheel 14 has a smaller ring 48 than the ring 38. The wheel 14 is otherwise identical in construction to the wheel 15. The wheels 16 and 17 are of identical size and shape to the wheel 15 and are therefore not described in detail.

Referring particularly to FIG. 3, each of the flexible support elements 18 is of annular shape. The flexible support elements 18 may comprise, for example, rubber bands or O-rings. The flexible support elements 18 have an inner diameter the same size or advantageously smaller than an outer diameter of the elongate rod 12 to be resiliently secured to the elongate rod at any longitudinal position for supporting an associated one of the wheels 14–17. Particularly, the flexible support element should be of a large enough size so that it can be readily positioned on the elongate rod 12, but be small enough so that it will remain in place when not being repositioned, as described below.

In application, and with reference to FIG. 4, the elongate rod is inserted into a ground surface G advantageously by a user stepping on one or both sides of the stepping rod 34 to drive the stake 32 into the ground G proximate the location of a plant. This can be done before or after planting. The elongate rod 12 can be driven into the ground so that the stepping rod 34 is resting on the ground or space a select distance above the ground.

The flexible support elements 18 and wheels 14–17 are alternately slid onto the elongate rod 12 in sequence, as is generally illustrated in FIG. 3. In the illustrated embodiment of the invention, one of the flexible support elements 18 is slid onto the elongate rod 12 a select distance, for example 6", above the stepping rod 34. The wheel 17 is then slid onto the rod 12 until it rests on the lowermost flexible support element 18. How the flexible support element 18 is slid onto the rod depends on the type of element used. If an O-ring, then the O-ring can be slid down or rolled on. If a rubber band, then the rubber band can be expanded and once in position can be retracted. In either case, the thickness of the flexible support element 18 should be sufficient so that the hub 36 is supported thereon. If a rubber band is used, then the rubber band can be doubled up to provide greater thickness, as will be apparent. Specifically, and with reference to FIG. 5, the flexible support element 18 is received within the counterbore 44 so that the shoulder 46 rests on the flexible support element 18. This conceals the flexible support element 18 and protects it from the elements. As is apparent, the counterbore 44 can have any select length, sufficient to receive the flexible support element 18. Also, the counterbore 44 can be omitted so the flexible support element directly supports a lower edge of the hub 36, as is apparent.

The procedure is then repeated, with another flexible support element 18 slid into position a select distance, for example 12", above the lowermost support element 18. Next, the wheel 16 is lowered onto the rod 12 until it is supported by the flexible support element 18. The process is then repeated for the wheels 15 and 14.

As described, each flexible support element 18 supports an associated one of the wheels 14–17 by virtue of the tubular hub 36 being telescopically received on the rod 12 with its shoulder 46 bearing on the associated flexible support element 18. The flexible support elements 18 restrict downward movement of the associated wheels 14–18 while allowing free rotation and upward movement of the associated wheel. For example, the angular position of the spokes 40 can play an important role in plant support. Indeed, the spokes 40 need not be aligned, as illustrated in the figures. The user can simply grasp the wheel 15, for example, and rotate it to any angular position. This can be done by raising the wheel 15 slightly and turning it. Likewise, the wheels 14–17 can be repositioned at any time by moving its associated flexible support element 18 to any longitudinal position on the elongate rod and then sliding the particular wheel 14–17 to be supported on the flexible support element 18.

As particularly illustrated in FIG. 2, a plant P includes a plurality of stalks S supported by the wheels 14–17. Particularly, the stalks S are retained within the rings 38 or 48 to be supported thereon. As plant growth cannot be predicted, the spokes 40 may be placed in any desired orientation initially. If plant growth requires repositioning, the universal adaptability of the plant cage 10 allows the plant itself to cause a particular wheel 14–17 to rotate to accommodate the growth. Particularly, this is due to the fact that the flexible support elements 18 are resiliently secured to the elongate rods 12 to restrict downward movement of the associated wheels 14–17 while permitting rotary and upward movement of the associated wheel 14–17.

As is apparent, the plant cage 10 can be used with any type of plant material requiring support. Among the more common types of plants are tomato plants or peonies or the like. As noted above, the wheels 14–17 can be configured of virtually any select size according to the type of plant material to be used and can be used in any combination of sizes such as going from narrow to wide or wide to narrow or alternating sizes, as necessary or desired.

The wheels 14–17 can be formed of numerous different materials. For example, the wheels 14–17 may be formed of a molded plastic or the like which is lightweight in nature and will not rust. The elements of the wheels 14–17 may be circular in cross-section, as illustrated, or may be of other configuration.

Thus, in accordance with the invention, there is provided an adjustable plant cage which provides for universal adjustability.

I claim:

1. An adjustable plant cage comprising:
   an elongate rod having opposite first and second ends, the first end for insertion into a ground surface with the rod extending upwardly;

a plurality of wheels, each wheel comprising a hub slidably received on the elongate rod, a ring, and spokes connecting the ring to the hub; and a plurality of annular flexible support elements, each positioned at a select longitudinal position on the elongate rod to support an associated one of the wheels.

2. The adjustable plant cage of claim 1 wherein the flexible support elements comprise rubber bands.

3. The adjustable plant cage of claim 1 wherein the flexible support elements comprise O-rings.

4. The adjustable plant cage of claim 1 wherein each hub comprises a tubular hub telescopically received on the rod and bearing on one of the flexible support elements.

5. The adjustable plant cage of claim 4 wherein the hub conceals the flexible support element.

6. The adjustable plant cage of claim 1 wherein each flexible support elements restricts downward movement of its associated wheel while allowing free rotation and upward movement of its associated wheel.

7. The adjustable plant cage of claim 1 further comprising a stepping rod extending transversely of the elongate rod.

8. An adjustable plant cage comprising:

an elongate rod having a lower end for insertion into a ground surface with the rod extending upwardly;

a plurality of wheels, each wheel comprising a hub slidably received on the elongate rod, a ring, and spokes connecting the ring to the hub; and a plurality of support means each resiliently secured to the elongate rod at any longitudinal position for supporting an associated one of the wheels to restrict downward movement of the associated wheel while permitting rotary and upward movement of the associated wheel.

9. The adjustable plant cage of claim 8 wherein the support means comprise rubber bands.

10. The adjustable plant cage of claim 8 wherein the support means comprise O-rings.

11. The adjustable plant cage of claim 8 wherein each hub comprises a tubular hub telescopically received on the rod and bearing on one of the support means.

12. The adjustable plant cage of claim 8 wherein the hub conceals the flexible support element.

13. The adjustable plant cage of claim 8 further comprising a stepping rod extending transversely of the elongate rod.

* * * * *